March 14, 1967  A. BECHLER  3,308,693
AUTOMATIC LATHE
Filed June 23, 1964  4 Sheets-Sheet 1

INVENTOR
ANDRÉ BECHLER
BY
RICHEY, McNENNY & FARRINGTON
Donald W. Farrington
ATTORNEYS

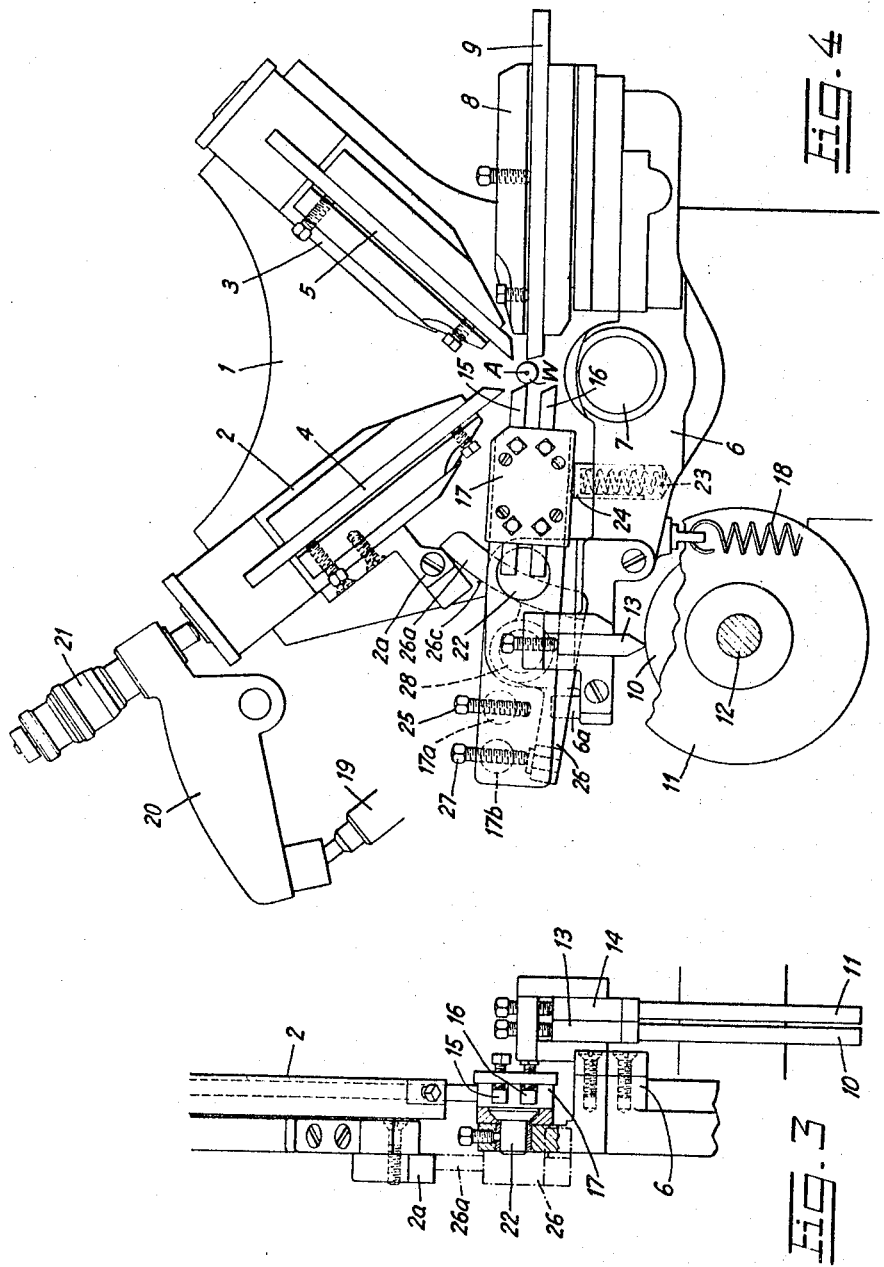

INVENTOR
ANDRÉ BECHLER
BY
RICHEY, McNENNY & FARRINGTON
ATTORNEYS

United States Patent Office 3,308,693
Patented Mar. 14, 1967

3,308,693
AUTOMATIC LATHE
André Bechler, 4 Rue Centrale, Moutier Switzerland
Filed June 23, 1964, Ser. No. 377,196
Claims priority, application Switzerland, July 2, 1963, 8,183/63
7 Claims. (Cl. 82—2)

The present invention relates to automatic lathes and more particularly to an automatic lathe comprising fixed support means, a work-holding spindle mounted on said support means for rotation about a fixed main axis, a member movably mounted on said fixed support means, tool holder means on said member, adapted to hold at least two tools and guide same for movement in directions at least approximately perpendicular to said fixed main axis, tool holder slides mounted on said support means in a fan-like arrangement and each adapted to hold a further tool and guide same for movement in a direction at least approximately perpendicular to said fixed main axis, a camshaft and cams secured on the camshaft to move said member and said tool holder slides.

There is a growing need to augment the number of tools which may be put into operation on such lathes during each machining cycle. The solution of this problem is difficult since it must not only bring an acceptable disposition of a supplemental tool in a region where in known automatic lathes there are already tools and parts for their control in a very compact arrangement, but also of the supplemental means needed for the control of the supplemental tool.

The solution suggested by the present invention consists in that said tool holder means includes a tool holder movably mounted on said member and adapted to hold two superposed tools and in that one of said tool holder slides is adapted to impart to said tool holder a tool-change-over movement by which one of the tools held by same is removed from its work position whilst at the same time the other of the tools held by same is put in its work position.

The accompanying drawings represent by way of example, a preferred embodiment of the invention and a modification of detail. For the sake of clarity of the drawings, some tool holders and corresponding control members have been omitted.

Figure 1:
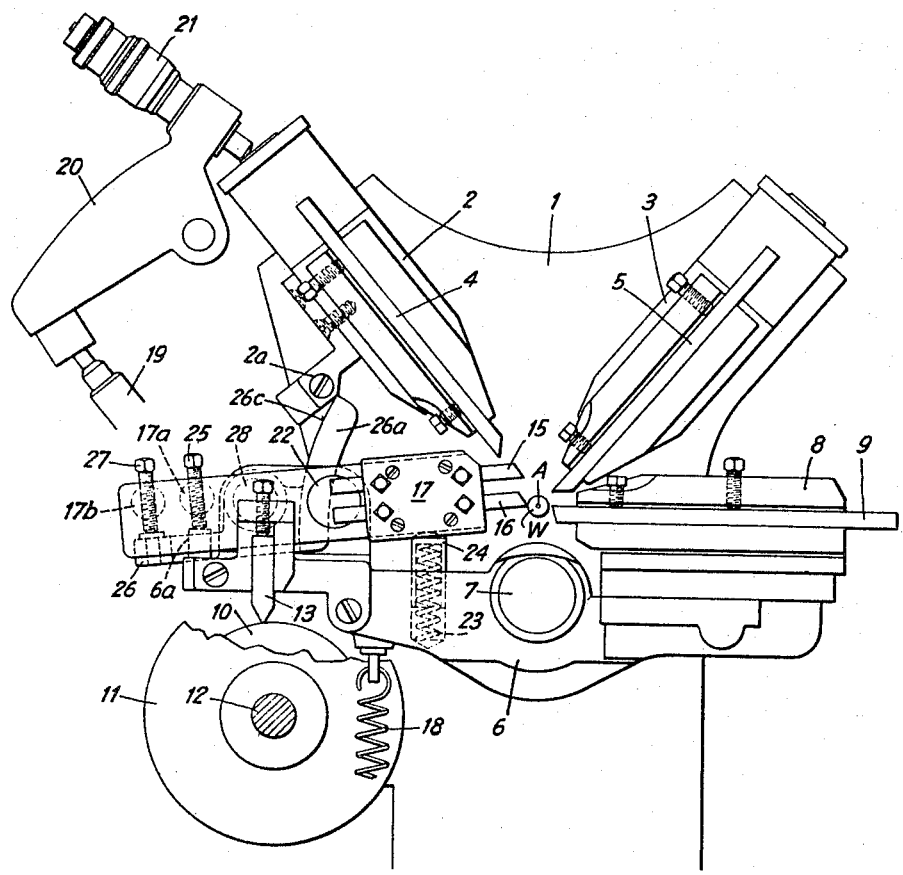
Figure 2:
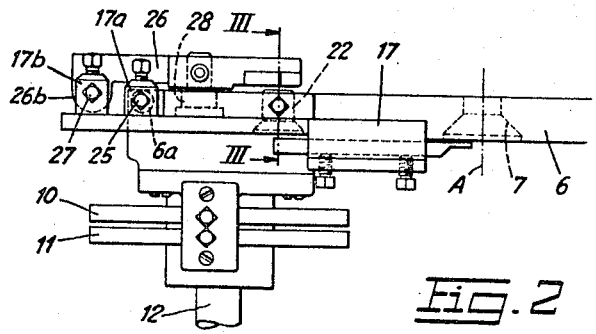
Figure 5:
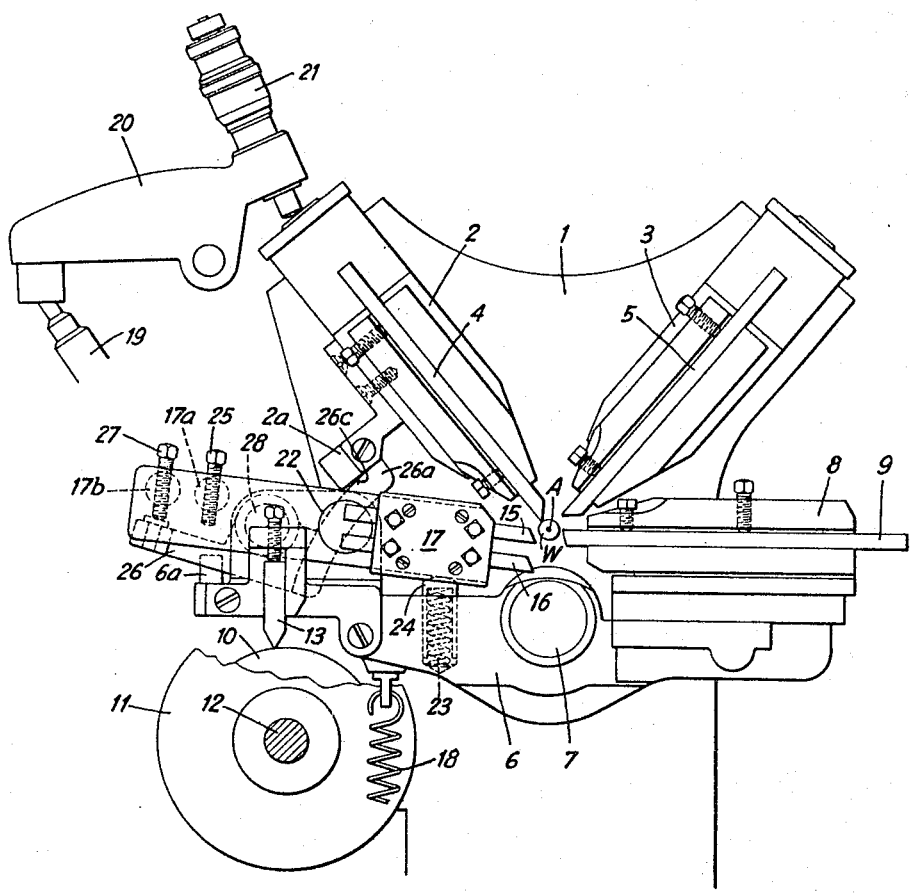
Figure 6:
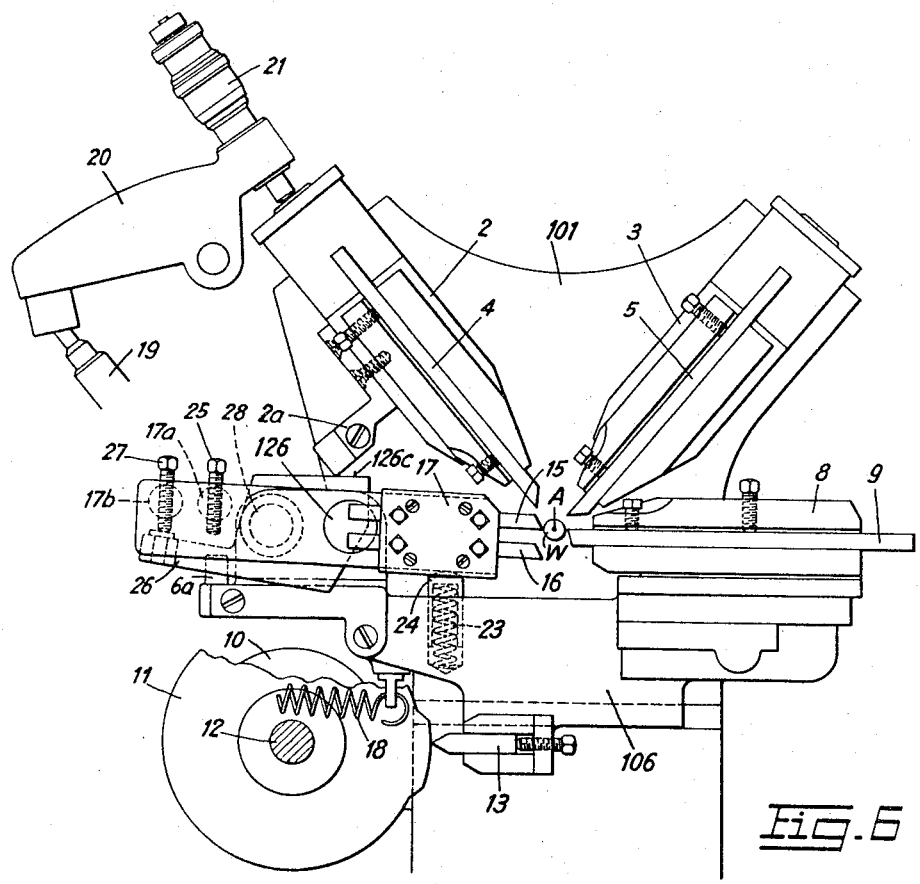

FIG. 1 is a view taken in the direction of the main axis of an automatic lathe embodying the invention, FIG. 2 is a partial top view corresponding to FIG. 1, FIG. 3 is partially a side view and partially a sectional view taken along line III—III of FIG. 2, FIGS. 4 and 5 are views similar to FIG. 1, but showing the movable parts in different positions, and FIG. 6 is a view similar to FIG. 4, of a modification.

In the drawings the reference numeral 1 denotes the body of a spindlestock or of a center rest of an automatic lathe; this body constitutes a fixed support means for tool holder slides 2 and 3 which are disposed in a fan-like arrangement in front of this body when seen in the direction of the main axis A of the lathe and on which the tools 4 and 5, respectively, are held. Member 6 is mounted on this body by means of a pivot pin 7 and is equipped on one side of the main axis of the lathe with a tool holder 8 in which a tool 9 is held. The lathe comprises the conventional camshaft 12 which performs one revolution during each machining cycle. Cams as 10 and 11 act after one another on cam followers 14, 13 adjustable on the member 6 which is biased by a spring 18, for controlling the movements of the tool 9 and also the movements of tools 15, 16 held on a special tool holder 17, the paths of the movements of all these tools as controlled by said cams being at least approximately perpendicular to the main axis A of the lathe. Other cams which are similar to the cam 10 and 11 and also secured to the camshaft 12 act, by means of well known mechanisms which include each a push rode 19, a rocking lever 20 and an adjusting device 21 embodying a micrometric set screw, on the tool holder slides 2 and 3 for controlling the movements of the tools 4 and 5 along paths perpendicular to the main axis A of the lathe.

The tools 15 and 16 are superposed to each other and held fast in the special tool holder 17; during each machining cycle they intervene after each other and before the tool 4. The special tool holder 17 is constructed as a two-armed lever pivotally mounted on the member 6 by means of a pivot pin 22. A compression spring 23 is arranged in a blind hole of the member 6 and biases the tool holder 17 by means of a cup-shaped guiding piston 24 to press one end of a set screw 25 mounted on a portion 17a of the tool holder 17 on a lug 6a of the member 6 for the purpose of determining a first work position of the tool holder 17, namely that one which is represented on FIG. 1 and in which the cutting edge of the lower tool 16 is at the same level as the main axis A of the lathe.

A tool-change-over movement of the tool holder 17, which must be performed to bring the cutting edge of the upper tool 15 to this level, is obtained by the action of a lug 2a of the tool holder slide 2 on the tool-holder 17 by means of a two-armed lever 26 which is mounted on the member 6 by means of a pivot pin 28, this change-over movement being effected when the tool-holder slide 2 performs a first portion of its movement towards the work-position of the tool held thereby. The movement which is then imparted by the lug 2a directly to the portion 26a of the lever 26 is given by the portion 26b of this lever 26 to a set screw 27 mounted on a portion 17b of the tool holder 17; the set-screw 27 does allow for an adjustment of the level of the cutting edge of the tool 15 in its work position which is shown on FIG. 4.

It is easy to understand that if the member 6 is rocked during the time in which this tool 15 occupies its work position the level adjustment must subsist; for this reason the portion of surface 26c on which acts the lug 2a extends along an arc of circle the center of which coincides with the center of pivotal mounting to the member 6 when this tool 15 is in its work position, as can be seen from FIG. 4. In an obvious modification the arcuated surface concentric with the center of pivotal mounting of the member 6 when the tool 15 is in its work position could be provided on the lug 2a and the lug on the lever 26 would be a simple lug similar to lug 2a shown in the drawings.

Almost all has already been described about the operation. To complete the description it must merely be said that the tool holder slide 2, when it performs the second and final portion of the travel of its tool toward the work position, acts on the tool holder 17 in the same manner as during the first portion of its travel, but now to the purpose of removing the tool 15 from the workpiece W and of bringing its own tool 4 into its work position. Before the tool holder slide 2 is brought back into its start position shown on FIG. 1, the member 6 is rocked by th spring 18 in the anti-clockwise under the control of the cams 10, 11 in order to remove the path followed by the cutting edge of tool 15 during a tool-change-over movement from the workpiece W. During the return movement of the tool holder slide 2 into its start position shown on FIG. 1 the tool holder 17 is brought back to its corresponding position by the action of the spring 23.

In lieu of being mounted on a member as 6 which is pivotally mounted on fixed support means the tool holder 17 the tool-change-over movement of which is effected as described hereabove might be mounted together with the lever 26 or another equivalent transmission element on a slide 106 (FIG. 6) guided on fixed support means 101 to be movable along a rectilinear path perpendicular to the main axis A under the control of a cam as 11. In such modification one of the two contacting surface portions pertaining the one to a tool-holder slide imparting the tool-change-over movement and the other one 126c to a transmission member as 126 by means of which this slide imparts the movements, must extend parallelly to said rectilinear path of movement when the second tool (tool 16) occupies its work position, in order that the movement of the slide along this rectilinear path does not have any effect on the level adjustment of this tool.

I claim:

1. In an automatic lathe comprising fixed support means, a work-holding spindle mounted on said support means for rotation about a fixed main axis, a member movably mounted on said fixed support means, tool holder means on said member adapted to hold at least two tools and guide same for movement toward and away from said main axis in directions at least approximately perpendicular to said fixed main axis, tool holder slides mounted on said support means in a fan-like arrangement and each adapted to hold a further tool and guide same for movement in a direction at least approximately perpendicular to said fixed main axis, a camshaft and cams secured on said camshaft to move said member and said tool holder slides, said tool holder means including a tool holder movably mounted on said member and adapted to hold two superposed tools, said tool holder means including operator means operable only in response to movement of one of said tool holder slides adapted to impart to said tool holder a tool-change-over movement by which one of the tools held by same is removed from its work position and at the same time the other of the tools held by same is moved to its work position, said operator means being constructed and arranged so that it is insensitive to movement of said tool holder means toward and away from said main axis.

2. An automatic lathe as set out in claim 1, the arrangement being such that the tool-change-over movement is imparted to said tool holder by said one tool holder slide when this slide performs a first portion of its movement towards the work position of the tool held thereby, and furthermore such that the tool holder is further moved in the same direction to remove also said other tool held by same from its work position when said one tool slide performs a second and final portion of its movement towards the work position of the tool held thereby.

3. An automatic lathe as set out in claim 2, in which said tool holder is constructed as a two-armed lever pivotally mounted on said member, in which furthermore a transmission lever is pivotally mounted on said member and adapted to transmit movement from said one tool holder slide to said tool holder, a return spring bears on said members and biases said tool holder, a first set screw and a second set screw both adjustable on said tool holder, said first set screw being arranged to abut against said member to determine a rest position of said tool holder before a tool-change-over movement is imparted to same and said second set screw intervening as a movement transmission element between said transmission lever and said tool holder during the time in which said tool holder is removed from said rest position.

4. An automatic lathe as set out in claim 1, in which said member is pivotally mounted on said support means and in which an element is provided for transmitting the tool-change-over movement from said one tool holder slide to said tool holder and has a portion of surface which during such transmission coacts with a portion of surface of said one tool holder slide, one of these two surfaces extending along an arc of circle the center of which coincides with the center of pivotal mounting of said member on said support means when said other tool held by said tool holder is in its work position.

5. An automatic lathe as set out in claim 3, in which said member is pivotally mounted on said support means and in which said one tool holder slide has a portion of surface which coacts with a portion of surface of said transmission lever for transmitting the tool-change-over movement, one of these two portions of surfaces extending along an arc of circle the center of which coincides with the center of pivotal mounting of said member on said support means when said other tool held by said tool holder is in its work position.

6. An automatic lathe as set out in claim 1, in which said member is mounted on said support means for sliding along a rectilinear path and in which an element is provided for transmitting the tool-change-over movement from said one tool holder slide to said tool holder and has a portion of surface which during such transmission coacts with a portion of surface of said one tool holder slide, one of these two surfaces extending parallelly to said rectilinear path when said other tool held by said tool holder is in its work position.

7. An automatic lathe as set out in claim 3, in which said member is mounted on said support means for sliding along a rectilinear path and in which said one tool holder slide has a portion of surface which coacts with a portion of surface of said transmission lever for transmitting the tool-change-over movement, one of these two portions of surfaces extending parallelly to said rectilinear path when said other tool held by said tool holder is in its work position.

References Cited by the Examiner

UNITED STATES PATENTS

| 1,420,683 | 6/1922 | Bright | 82—25 X |
| 2,348,052 | 5/1944 | Boillat | 82—2 |
| 2,499,509 | 3/1950 | Kendall | 82—25 |

FOREIGN PATENTS 366,436  12/1962  Switzerland.

WILLIAM W. DYER, Jr., *Primary Examiner.*

LEONIDAS VLACHOS, *Examiner.*